(12) United States Patent
Theron

(10) Patent No.: US 12,112,914 B2
(45) Date of Patent: Oct. 8, 2024

(54) METHOD AND CIRCUIT FOR ENABLING A DIRECT CURRENT SOURCE TO POWER A LOAD CIRCUIT DESIGNED FOR ALTERNATING CURRENT INPUT

(71) Applicant: POWEROPTIMAL (PTY) LTD, Cape Town (ZA)

(72) Inventor: Jacob Johannes Theron, Cape Town (ZA)

(73) Assignee: POWEROPTIMAL (PTY) LTD, Cape Town (ZA)

( * ) Notice: Subject to any disclaimer, the term of this patent is extended or adjusted under 35 U.S.C. 154(b) by 282 days.

(21) Appl. No.: 17/797,977

(22) PCT Filed: Jan. 25, 2021

(86) PCT No.: PCT/IB2021/050542
§ 371 (c)(1),
(2) Date: Aug. 5, 2022

(87) PCT Pub. No.: WO2021/156697
PCT Pub. Date: Aug. 12, 2021

(65) Prior Publication Data
US 2023/0068037 A1 Mar. 2, 2023

(30) Foreign Application Priority Data
Feb. 7, 2020 (GB) ..................... 2001707

(51) Int. Cl.
*H01H 9/54* (2006.01)
*H01H 9/16* (2006.01)
(Continued)

(52) U.S. Cl.
CPC ............. *H01H 9/541* (2013.01); *H01H 9/16* (2013.01); *H01H 9/30* (2013.01); *H01H 33/596* (2013.01); *H02H 1/0015* (2013.01)

(58) Field of Classification Search
CPC ............ H01H 9/541; H01H 9/16; H01H 9/30; H01H 33/596; H01H 9/54; H01H 9/167;
(Continued)

(56) References Cited

U.S. PATENT DOCUMENTS

| 2012/0169122 A1 | 7/2012 | Takahashi et al. |
| 2015/0035539 A1* | 2/2015 | Wakida ................ G01R 31/327 324/418 |

(Continued)

FOREIGN PATENT DOCUMENTS

| DE | 202012100023 U1 | 4/2012 |
| EP | 2469553 A1 | 6/2012 |
| WO | 2021/156697 A1 | 8/2021 |

OTHER PUBLICATIONS

Combined Search and Examination Report under Sections 17 & 18(3) for GB2001707.5—Jul. 31, 2020.
(Continued)

*Primary Examiner* — Dharti H Patel
(74) *Attorney, Agent, or Firm* — Quarles & Brady, LLP

(57) ABSTRACT

A circuit and method are disclosed enabling a direct current (DC) power source to power a load circuit designed for alternating current (AC) input. The circuit is arranged to be connected between a DC power source and a load circuit in which the load circuit includes an electric load and a switch with a mechanical contact in series with the load. The circuit comprises a contact opening detector arranged to detect an opening event of the switch contact and a damping component arranged to be triggered in response to the contact opening detector detecting a contact opening event. The triggered damping component causes a momentary lowering of a load circuit input voltage, such that the momentary lowering of the load circuit input voltage prevents the sustaining of an electric arc across the opened switch contact.

20 Claims, 8 Drawing Sheets

(51) Int. Cl.
*H01H 9/30* (2006.01)
*H01H 33/59* (2006.01)
*H02H 1/00* (2006.01)

(58) Field of Classification Search
CPC .......... H01H 2009/307; H02H 1/0015; H02H 1/0023; H02H 1/00; H02J 1/06
USPC ............................................................ 361/1
See application file for complete search history.

(56) References Cited

U.S. PATENT DOCUMENTS

| 2015/0098164 A1* | 4/2015 | Lenig .................. H01H 9/56 |
| | | 361/185 |
| 2016/0111870 A1 | 4/2016 | Murano et al. |
| 2017/0229256 A1* | 8/2017 | Wilkening ............. H01H 9/54 |

OTHER PUBLICATIONS

International Search Report for PCT/IB2021/050542—Apr. 26, 2021.
International Preliminary Report on Patentability—Jan. 27, 2022.

* cited by examiner

METHOD AND CIRCUIT FOR ENABLING A DIRECT CURRENT SOURCE TO POWER A LOAD CIRCUIT DESIGNED FOR ALTERNATING CURRENT INPUT

CROSS-REFERENCE TO RELATED APPLICATIONS

This patent application is a national stage filing under 35 U.S.C. § 371 of International Application No. PCT/IB2021/050542, filed Jan. 25, 2021, which claims the benefit of priority of United Kingdom Patent Application No. 2001707.5, filed Feb. 7, 2020, each of which are incorporated herein by reference in their entirety.

FIELD OF THE INVENTION

The invention disclosed herein relates to circuitry enabling the use of a direct current (DC) power source to power devices having switching components designed for use with alternating current (AC). It finds particular application in its use with photovoltaic (PV) modules as a DC power source to directly power a hot water cylinder.

BACKGROUND TO THE INVENTION

Solar power is an attractive alternative and sustainable power source, particularly in parts of the world that enjoy a generous amount of sunlight throughout the year. Solar power has gained tremendous popularity of late as an alternative power source for residential use for households that want to become self-sufficient in terms of their electricity needs, or at least less reliant on a power supply from utility companies.

There are economic factors that contribute to this surge in demand for PV installations, such as the ever-increasing price charged for electricity by utilities, and the fact that PV modules have become somewhat less expensive over the years. The time required to break even with the capital expenditure of the PV installation versus the associated savings has therefore become shorter, making PV power more attractive.

The residential hot water cylinder is generally among the highest power consumers in a household. Some sources estimate that the hot water cylinder is responsible for as high as 40% to 50% of a household's electricity consumption. This makes the residential hot water cylinder a prime candidate for PV power.

Many households that are considering the transition to PV power for their hot water cylinders have existing electric hot water cylinders installed. Rather than replacing the existing electric hot water cylinder with a solar hot water cylinder (e.g. a thermosiphon hot water system), it may be less costly to retrofit the existing installation and directly power the electric hot water cylinder from a PV power source.

However, such existing hot water cylinders would be configured to be powered by alternating current (AC) mains electricity which, in South Africa, has a nominal voltage of $230V_{AC}$ at 50 Hz. The contacts on thermostats used in mains-powered hot water cylinders are generally not suited for switching direct current (DC). The travel of the switching contact between its closed and open positions is generally in the order of about 2 millimetres. If this contact opens at an instant at which the mains supply voltage is around the zero-crossing, no arcing will occur across the opened contact. However, it the mains supply voltage at that instant is sufficiently high, an arc may form across the open contacts and will remain arcing until such time as the voltage again approaches the zero-crossing (in the order of about ±10V depending on the travel of the switching contact).

In the case of a DC supply, such as from a PV module, the contact will inevitably open on a non-zero voltage and, since the supply voltage would have no zero-crossing, the arc would endure until such time as the supply voltage is removed, falls below a certain voltage (e.g. when the incident sunlight on a PV module decreases), or when the switching contact fails catastrophically.

Consequently, a retrofit PV power supply on an electric hot water cylinder also requires an inverter to convert the DC output of the PV modules (often stored in battery banks) to an AC supply for which the thermostat is designed (i.e. mains voltage). The required capital expenditure is dramatically increased with the addition of the required inverter, battery banks, and charger components which places this technology out of the reach of many of the low- to medium-income households who would arguably benefit most from a PV-powered hot water cylinder.

The Applicant considers there to be room for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a circuit arranged to be connected between a direct current (DC) power source and a load circuit in which the load circuit includes an electric load and a switch with a mechanical contact in series with the load, the circuit comprising a contact opening detector arranged to detect an opening event of the switch contact, and a damping component arranged to be triggered in response to the contact opening detector detecting a contact opening event, the triggered damping component causing a momentary lowering of a load circuit input voltage, such that the momentary lowering of the load circuit input voltage prevents the sustaining of an electric arc across the opened switch contact.

These features may enable using a DC power source to power a load with a series switch contact (such as a hot water cylinder and its thermostat, for example) with the circuit quenching an arc or preventing the arc from being sustained for a substantial period of time, that may form when the switch contact opens while a DC current flows through the contact.

The DC power source may have an internal resistance. The internal resistance of such power supplies causes an output voltage of the power supply to lower when a load is connected thereto, such as would be the case when the switch contact is closed. Conversely, the subsequent opening of the switch contact (and disconnecting of the load) may cause the output voltage of the power source to rise again. The contact opening detector may include a rising edge detector that produces a trigger signal when a rising edge is detected in the output voltage of the power source.

These features may enable the circuit to detect the opening of the switch by monitoring the associated rising edge of the power supply output voltage.

The rising edge detector may include a differentiator circuit. This feature may provide the circuit with a pulse voltage signal in the event of the switch contact opening, the pulse voltage signal being a time derivative voltage signal (dV/dt) of the rising edge of the power supply output voltage.

The rising edge detector may include a comparator component arranged to produce the trigger signal if a differentiator output voltage exceeds a reference voltage.

This feature may enable the circuit to produce a pulse signal (to function as the trigger signal) if the differentiator produces a pulse output of sufficient amplitude, with the produced pulse signal having a known (and substantially constant) amplitude, as opposed to the variable amplitude of the differentiator circuit output voltage, i.e. the time derivative voltage signal.

In other embodiments, the functionality of the rising edge detector may be performed by a digital processor that samples the power source output voltage to monitor and detect a rising edge in the power supply output voltage and produce a trigger signal when a rising edge is detected in the output voltage of the power source.

The damping component may be arranged to be triggered for a configured damping period and to reset the damping component after the lapsing of the damping period, thereby undoing the lowering of the load circuit input voltage.

This feature may enable the circuit to be configured such that the damping period has a predictable duration, which duration may be the requisite time to quench an arc across the opened switch contact.

The circuit may include a lockout component arranged to disable the damping component from again being triggered for a lockout period following the triggering of the damping component, the lockout period being longer than the damping period, so as to prevent the damping component from being triggered due to a rising edge in the output voltage of the power supply caused by the resetting of the damping component.

The lockout component may comprise a first monostable multivibrator arranged to be triggered by the trigger signal and to produce an output pulse corresponding to the lockout period; and the damping component may include a second monostable multivibrator arranged to be triggered by the output pulse of the first monostable multivibrator and to produce an output pulse corresponding to the damping period, and a damping switch activated by the output pulse of the second monostable multivibrator, the damping switch arranged to lower the load circuit input voltage by connecting a low impedance damping load in parallel with the load circuit when activated.

These features may enable the respective monostable multivibrators to produce a one-shot pulse voltage signal with a preconfigured pulse width, with the pulse widths being predictable and repeatable. An inherent feature of a monostable multivibrator is that it returns to its former (reset) state after being triggered, making it suitable to implement the controlling of the damping period and lockout period.

The switch may be a semiconductor switch, and the impedance of the damping load may be provided by the on-state resistance of the semiconductor switch. The semiconductor switch may be a field effect transistor (FET).

These features may enable the semiconductor switch to cause a near short-circuit, since the internal resistance is generally sub 1 Ohm, thereby enabling the momentary lowering of the input voltage to the load circuit.

The first and second monostable multivibrators may be formed by a first and a second D-type flip-flop respectively, each of the first and second flip-flop having its data input connected to a constant high input so as to produce a high output value on its output pin upon a rising edge occurring on its clock input, and an RC circuit connected to the output pin of the flip-flop configured to produce a timed rising voltage upon the output pin outputting a high value, wherein the rising voltage of the RC circuit is connected to the reset pin of the flip-flop so as to cause the flip-flop to be reset after a period determined by the time constant of the RC circuit.

The trigger signal of the comparator may be connected to the clock input of the first flip-flop, the output of the first flip-flop connected to the clock input of the second flip flop and the output of the second flip flop connected to the damping switch; and the lockout period and the damping period may be determined by the time constant of the RC circuit of the first and second flip-flop respectively.

The circuit may further include a full-bridge rectifier to enable reverse-polarity connection of the circuit to the power source.

The circuit may further include an indicator arranged to indicate when a terminal of the power source conducts electric current to an earth connection.

The indicator may include a first light emitting diode (LED) connected between a positive power source connection and the earth connection; and a second light emitting diode connected to the earth connection and a negative power source connection, such that both LED's illuminate when neither power source connection conducts electric current to the earth connection and such that only one of the first or second LED illuminates if the negative or positive power source connections conducts electric current to the earth connection.

These features may enable an operator to rapidly detect a faulty power supply connection, which may cause an earth fault.

In accordance with a further aspect of the invention there is provided a method of enabling a direct current (DC) power source to power a load circuit designed for alternating current (AC) input comprising the steps of:

connecting a DC input voltage to a load circuit, the DC input voltage being derived from a DC power source;

monitoring a switch contact to detect an opening event of the contact, the contact being connected in series with a load in the load circuit; and in response to an opening event of the contact being detected, momentarily lowering the input voltage of the load circuit, such that the momentary lowering of the load circuit input voltage prevents the sustaining of an electric arc across the opened switch contact.

The DC power source may have an internal resistance such that the contact being closed causes an output voltage of the power source to lower, the subsequent opening of the switch contact causing the output voltage of the power source to rise again. Monitoring the contact to detect an opening event may include detecting a rising edge in the output voltage of the power source, and producing a trigger signal in response to detecting the rising edge.

Detecting the rising edge in the output voltage of the power source may include producing a time derivative voltage signal of the output voltage of the power source.

Detecting the rising edge in the output voltage of the power source may include comparing the time derivative voltage signal to a reference voltage. The trigger signal may be produced if the time derivative voltage signal exceeds the reference voltage.

The trigger signal may be produced for a configured damping period. The undoing of the lowering of the load circuit input voltage may occur after the lapsing of the damping period.

Detecting of a rising edge in the output voltage of the power supply may be disabled for a lockout period following the producing of the trigger signal, which may prevent a trigger signal being caused by undoing the lowering of the load circuit input voltage.

Momentarily lowering the input voltage of the load circuit may include connecting a low impedance damping load in parallel with the load circuit for the duration of the damping period.

An embodiment of the invention will now be described, by way of example only, with reference to the accompanying drawings.

DETAILED DESCRIPTION WITH REFERENCE TO THE DRAWINGS

A circuit and method is described below that enables a direct current (DC) power source to power a load circuit designed for alternating current (AC) input. The circuit is arranged to be connected between a DC power source, such as a photovoltaic power (PV) source, and a load circuit, such as a residential hot water cylinder. In some of the exemplary embodiments described below, the circuit will be illustrated and described using a single PV panel as an exemplary DC power source, i.e. a PV module. However, it will be apparent to those skilled in the art that a PV array in any combination of series and/or parallel connected PV modules may also be used as DC power source, for example.

Advantageously, PV modules are characterised in that they have an internal resistance that may vary due to environmental circumstances, for example. The internal resistance of the PV module has the effect that when a load is connected thereto, the output voltage of the PV module (and thus the input voltage to the load) will drop from the open-loop voltage of the PV module to a voltage somewhat lower. The precise lowering in the PV module output voltage depends on the particular PV module (or PV array) arrangement, its internal resistance (coupled to environmental circumstances such as incident sunlight), and the magnitude of the load.

Furthermore, since the PV modules are inherently current-limited, PV modules may be momentarily short-circuited (or near short-circuited) without causing damage thereto. The relevance of this characteristic will become more apparent in the description that follows.

As mentioned above, the circuit is further arranged to be connected to a load circuit that has an electric load in series with a switch having a mechanical switch contact or contacts. A typical example of such a load circuit is a hot water cylinder in which the load is the electric element and the switch is a thermostat having a contact actuated by a bi-metallic stem.

The circuit includes a contact opening detector that is arranged to detect an opening event of the switch contact, and thus an event at which there is a likelihood of an arc forming across the opening (or opened) switch contacts. The circuit further includes a damping component that is arranged to be triggered in response to the contact opening detector detecting a contact opening event. The triggered damping component causes a momentary lowering of a load circuit input voltage, such that the momentary lowering of the load circuit input voltage prevents the sustaining of an electric arc across the opened switch contact. In some embodiments, this may be effected by switching a low impedance, preferably a near short-circuit, across the load circuit for the duration of a configured damping period.

Figure 1:
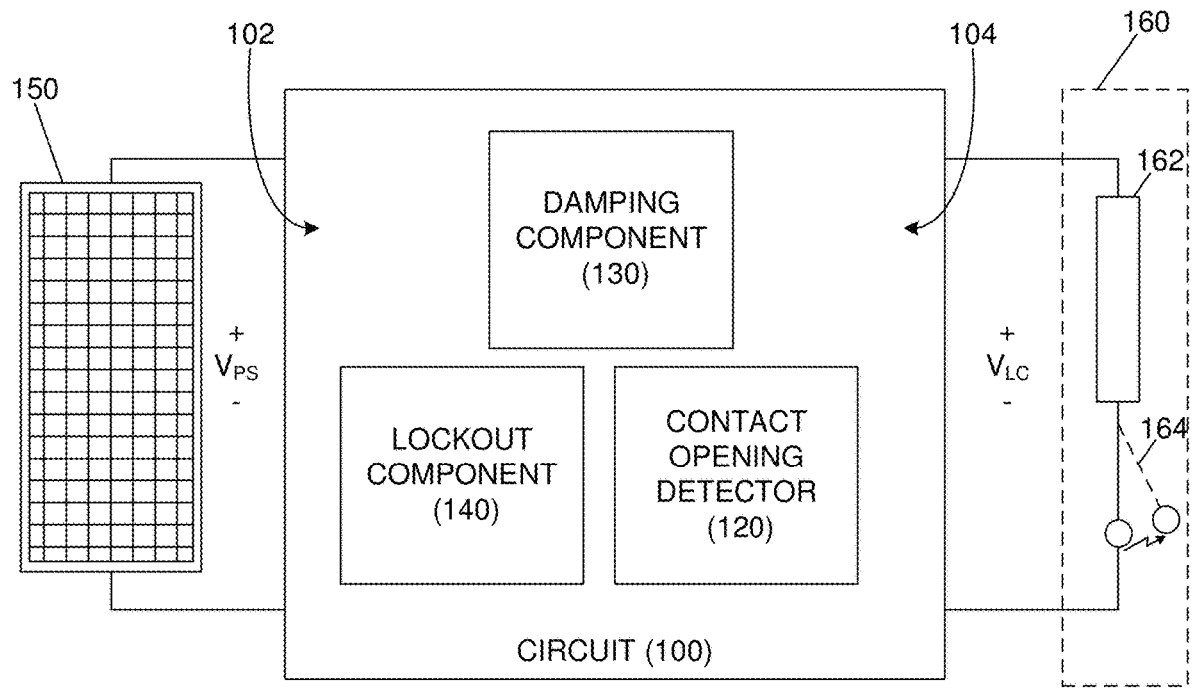
FIG. 1 is a block diagram illustrating high level functional components of a circuit in accordance with the invention.

FIG. 1 is a diagram showing high level functional blocks of a circuit (100) in accordance with the invention to facilitate a high-level description of its functioning. The functioning of the circuit (100) will be explained with reference to FIG. 2 also, which is a graph showing the input voltage to the load circuit ($V_{LC}$) against time.

An input side (102) of the circuit (100) is connected to a DC power source which, in this exemplary embodiment, is a PV module (150) producing a DC output voltage ($V_{PS}$). It follows that the output voltage ($V_{PS}$) of the PV module (150) is also the input voltage to the circuit (100) and this terminology may be used interchangeably.

It will also be appreciated that in certain embodiments the output voltage of the PV module ($V_{PS}$) is directly connected to the load circuit (160), in which case the load circuit input voltage ($V_{LC}$) is the same as the power supply output voltage ($V_{PS}$).

An output side (104) of the circuit (100) is connected to an electric load circuit (160) including an electric load (162) connected in series to a switch with a mechanical contact (164). The load circuit input voltage ($V_{LC}$) is thus also the output voltage of the circuit (100) and this terminology may be used interchangeably. The mechanical contact (164) may be originally designed for switching an alternating current (AC) power supply. This may have bearing on factors such as the travel of the contact (164). In this example, the contact (164) has a travel that is sufficiently short to cause an arc to form when the contact opens while conducting the DC current through the load (162).

The circuit (100) includes a contact opening detector (120) arranged to detect an event where the contact (164) opens, particularly while conducting electric current. Upon detecting the contact opening event, the contact opening detector (120) triggers a damping component (130) which lowers the input voltage to the load circuit ($V_{LC}$) for a configured damping period (DP). The damping period (DP) is selected to be sufficiently long, and the load circuit input voltage ($V_{LC}$) sufficiently lowered to ensure that any arc that may have formed across the contact (164) while opening would have been quenched.

In this embodiment, the contact opening detector (120) is configured to detect a contact opening event by monitoring the power supply voltage ($V_{PS}$). Due to the internal resistance of the PV module (150), the power supply voltage ($V_{PS}$) will drop from its open-loop voltage ($V_{OL}$) when the contact (164) closes and the load (162) drawing current from the PV module (150). When the contact (164) subsequently opens, the power supply voltage ($V_{PS}$) will rise to return to its open-loop voltage ($V_{OL}$). The contact opening detector (120) is configured to monitor the power supply voltage ($V_{PS}$) for a rising edge, which it then infers coincides with a contact opening event.

However, it will be appreciated that at the end of the damping period (DP), the damping component (130) will undo the lowering of the load circuit input voltage ($V_{LC}$), which is derived from the power supply voltage ($V_{PS}$). This will therefore also cause a rising edge in the power supply voltage ($V_{PS}$) to occur, but to which the contact opening detector (120) should not react, lest an endless loop of damping should be caused. The circuit (100) further includes a lockout component (140) which disables the opening contact opening detector (120) from reacting or triggering the damping component (130) for a lockout period (LP) following the detecting of a contact opening event.

Figure 2:
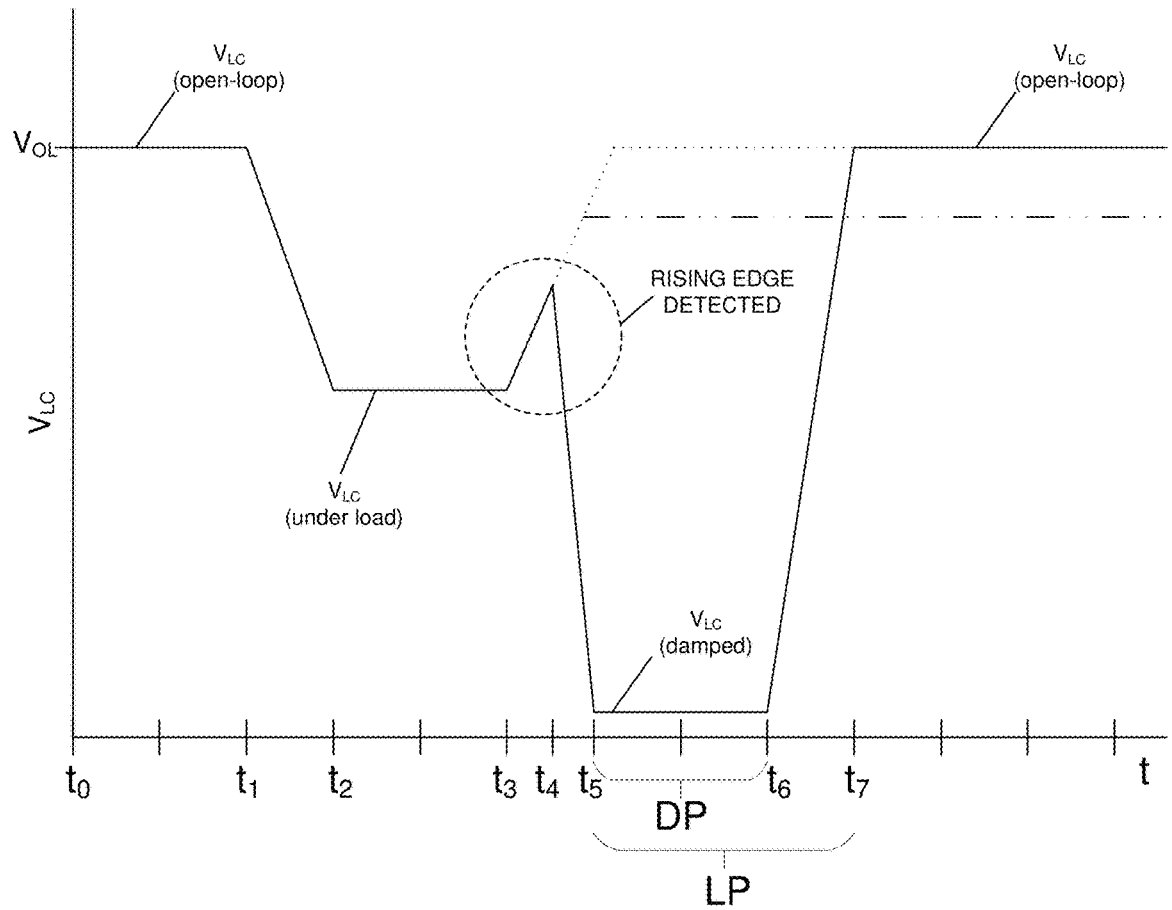
FIG. 2 is a graph of voltage versus time at selected events relevant to the functioning of the circuit of FIG. 1.

This sequence of events is illustrated on the graph shown in FIG. 2. At $t_0$, the contact (164) is open, and no current is drawn from the PV module (150). The load circuit input voltage ($V_{LC}$), being derived from the PV module output voltage ($V_{PS}$), is therefore at an open-loop voltage ($V_{OL}$). At $t_1$, the contact (164) closes and the load (162) begins to draw current from the PV module (150), causing the PV module output voltage ($V_{PS}$) and therefore also the load circuit input voltage ($V_{LC}$) to drop, settling at this lower voltage at $t_2$. At $t_3$, the contact (164) opens. A contact opening event is identified by the encircled peak in FIG. 2.

A dotted line in FIG. 2 illustrates the curve that $V_{LC}$ would be expected to follow if no arc was to form across the contact (164). However, if an arc was to form, the curve that $V_{LC}$ would follow, in the absence of intervention, would be more accurately illustrated by the dot-dash line in FIG. 2. This voltage difference is attributed to the voltage drop across the arcing contact (164).

However, the contact opening detector (120) monitors $V_{LC}$ for a rising edge and at $t_4$ it triggers the damping component (130) which, in turn, lowers $V_{LC}$ for the damping period (DP) between $t_5$ and $t_6$. At $t_6$, the damping component (130) is reset, thereby undoing the lowering of $V_{LC}$ and causing $V_{LC}$ to return to $V_{OL}$, reaching steady state at $t_7$. In the meantime, since $t_5$ or shortly thereafter, the lockout component (140) has disabled the contact opening detector (120) from reacting to a rising edge for the lockout period LP, which expires at $t_7$ or shortly thereafter when $V_{LC}$ is no longer rising.

In this manner, the circuit (100) detects a contact opening event and proceeds to quench the arc while preventing the circuit from triggering itself due to the rising edge in the voltage caused by its defensive measures.

Figure 3:
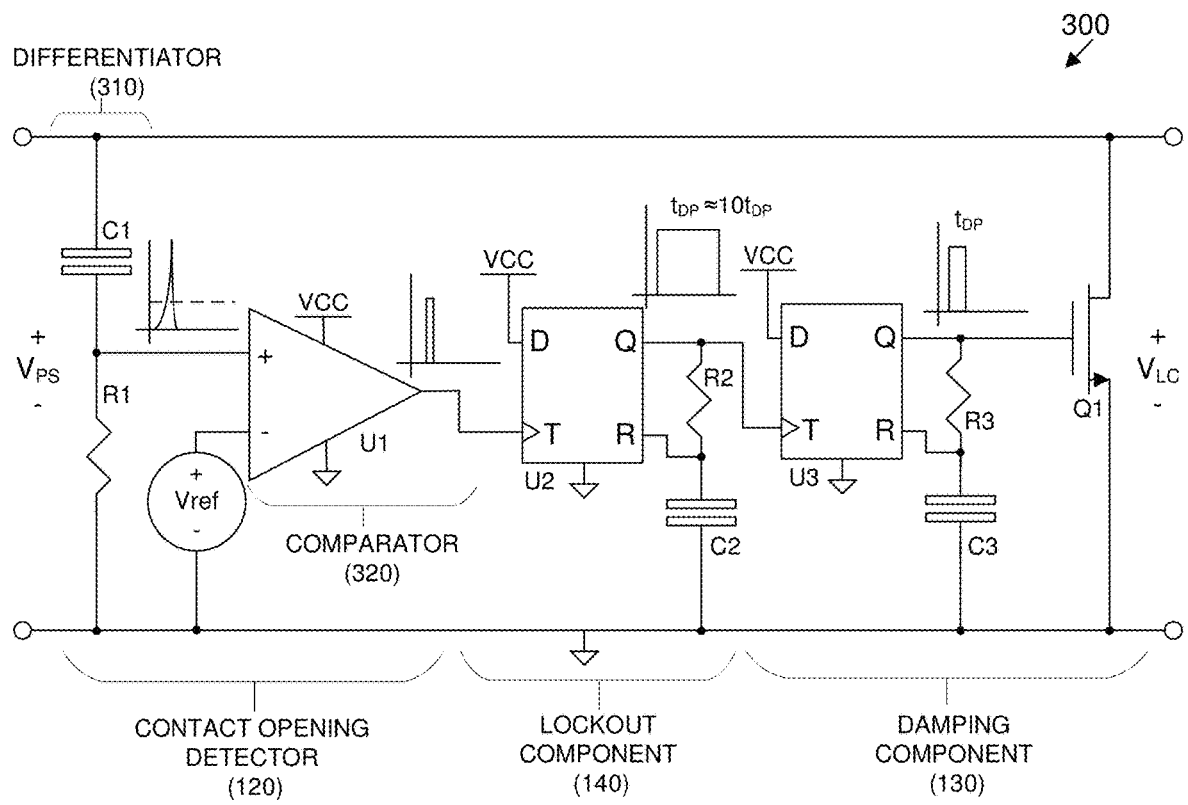
FIG. 3 is a schematic diagram showing an embodiment of a circuit in accordance with the invention.

FIG. 3 shows an embodiment of a circuit (300) in accordance with the invention in greater detail. The power supply or PV module (150) and the load circuit (160) has been omitted in FIG. 3 in the interest of simplicity, but the functionality of the circuit (300) will be explained as if the circuit is connected between a PV module (150) and a load circuit (160), similarly as in FIG. 1.

The power supply input terminals, on which the power supply input voltage ($V_{PS}$) is connected, runs straight through the circuit (300) and is connected to the load circuit (160), indicated by ($V_{LC}$). However, it will be appreciated that these voltages are for all intents and purposes the same in this particular embodiment, discarding the effects of any conduction losses as these are negligible.

The contact opening detector (120) in this embodiment of the circuit (300) is formed by an RC differentiator circuit (310) consisting of the capacitor C1 and resistor R1. When the contact (164) opens to disconnect the load (162), the power supply input voltage ($V_{PS}$) will have a rising edge as it returns to its open-loop voltage as described above. This rising edge will cause the differentiator (310) to output a voltage pulse at the junction of R1 and C1. The contact opening detector (120) further includes a comparator (320), formed by the operational amplifier (opamp) (U1), of which the non-inverting input is connected to the output of the differentiator (310), and the inverting input connected to a preconfigured reference voltage ($V_{ref}$). Therefore, if the differentiator (310) output pulse exceeds the reference voltage, the opamp (U1) will output a pulse at a known, regulated supply voltage (VCC), regulated at 12V in this embodiment. This enables the contact opening detector (120) to produce a trigger signal, i.e. the output of the opamp (U1), if the differentiator output pulse exceeds a certain threshold voltage, thereby minimising false triggers. Furthermore, since the trigger voltage is at a known supply voltage (VCC), it protects downstream digital electronics which may only be able to handle a certain maximum input voltage.

The lockout component (140) in this circuit (300) is implemented using a D-type flip-flop (U2) of which the clock input, or trigger input (T), is connected to the output of the comparator (320), i.e. the trigger signal. It may be worth pointing out that the trigger input (T) of a D-type flip-flop is edge triggered on a rising edge. The data input (D) of the flip-flop (U2) is connected to the internal supply voltage (VCC), thus representing a logic 1. If a rising edge occurs on the trigger input (T) (i.e. when the trigger signal is produced by the comparator (320)) the flip-flop (U2) will output this logic 1 on its data output (Q) represented by the 12V internal supply voltage (VCC). The data output (Q) will remain at 12V (logic 1) until such time as a logic 1 is input on its reset input (R).

The flip-flop (U2) has an RC circuit (R2, C2) connected between its data output (Q) and common, with the junction of the RC circuit being connected to the reset input (R) of the flip-flop (U). It will be appreciated that, immediately before the data output (Q) becomes a logic 1 (12V in this example) that the voltage at the junction (and thus on the reset input pin (R)) would be zero. When the logic 1 (12V) is output on the data output, the capacitor (C2) will charge exponentially at a rate determined by the RC time constant ($\tau = R2C2$). The electrical characteristics of the particular flip-flop (U2) will indicate at what minimum voltage an input may be recognised as a logic 1 input by the flip flop (U2). At such time as the capacitor (R2) is sufficiently charged for the voltage on the reset input pin (R) to reach this minimum high input voltage, the flip-flop (U2) will be reset and the data output (Q) return to a logic 0 (0V) value. It bears mention that the data output (Q), once clocked through by a trigger signal, will remain constant despite further trigger inputs being received until such time as the flip-flop is reset. In this particular configuration, the data output (Q) will therefore remain a logic 1 (12V) once triggered, until it is reset, despite further rising edges that may in the intervening time appear on its trigger input (T).

The flip-flop (U2) is therefore configured as a monostable multivibrator, also called a one-shot, which provides an output pulse of a preconfigured pulse width upon receiving a trigger input while in its reset state.

Similarly, the damping component (130) in this circuit (300) is implemented using a D-type flip-flop (U3) of which the clock input, or trigger input (T), is connected to the output (Q) of the aforementioned flip-flop (U2) of the lockout component (140). For the sake of convenience the flip-flop (U2) of the lockout component (140) will hereafter be referred to as the "first flip-flop" and that of the damping component (130) referred to as the "second flip-flop".

Again, it is emphasised that the trigger input (T) of a D-type flip-flop is edge triggered on a rising edge. The second flip-flop (U3) will therefore trigger as soon as the data output (Q) of the first flip-flop (U2) becomes a logic 1 (12V). However, the second flip-flop (U3) can only be triggered again once the data output (Q) of the first flip-flop (U2) (and thus the trigger input (T) of the second flip-flop (U3)) becomes a logic 0 (0V) and again becomes a logic 1, thereby providing a rising edge trigger.

The data input (D) of the second flip-flop (U3) is also connected to the internal supply voltage (VCC), thus representing a logic 1. If a rising edge occurs on the trigger input (T) of the second flip-flop (U3) (i.e. when the output (Q) of the first flip-flop (U2) becomes a logic 1) the second flip-flop (U3) will output this logic 1 on its data output (Q) represented by the 12V internal supply voltage (VCC).

It will therefore be appreciated that when the comparator (320) produces a trigger signal, the two flip-flops (U2, U3) will practically immediately clock a logic 1 to their respective data outputs (Q), with the propagation delay through the flip-flops (U2, U3) being negligible.

The data output (Q) of the second flip-flop (U3) is furthermore connected to the gate of an N-channel field effect transistor (FET) (Q1). The drain and the source of the FET (Q1) are connected to the positive and negative rails of the power supply voltage input ($V_{PS}$) respectively. When the data output (Q) of the second flip-flop (U3) becomes a logic 1 at 12V, the FET (Q1) will switch on, thereby creating a near short-circuit between the rails of the power supply output voltage ($V_{PS}$). The FET (Q1) has a small internal on-state resistance which is typically smaller than 1 Ohm. The FET (Q1) can therefore be said to connect a low impedance across the power supply voltage output ($V_{PS}$) which is the same voltage as the load circuit input voltage ($V_{LC}$).

The second flip-flop (U3) has a similar RC circuit (R3, C3) connected to its data output (Q) and reset pin (R) as that of the first flip-flop (U2). However, this RC circuit (R3, C3) differs from that of the first flip-flop (R2, C2) in that the time constant of the second flip-flop's RC circuit (R3, C3) is chosen to be an order smaller than that of the first flip-flop (R2, C2). In this circuit (300), the values of the resistors and capacitors of the two RC circuits (R2C2, R3C3) are chosen so that the time constant of the second flip-flop's RC circuit (R3, C3) is approximately 10 times smaller.

It follows that the data output (Q) of the second flip-flop (U3) will therefore remain at a logic 1 for about one tenth the time that the data output (Q) of the first flip-flop (U2) remains a logic 1. These time periods correspond to the lockout period (LP) and the damping period (DP), with the damping period being the shorter of the two. Since the second flip-flop (U3) cannot be triggered again before the data output (Q) of the first flip-flop (U2) has gone low (0V), it is effectively disabled by the lockout component (140) from reacting to a rising edge in the power supply voltage output ($V_{PS}$) (which is the same voltage as the load circuit input voltage ($V_{LC}$)) for the duration of the lockout period following it being triggered.

Each of the flip-flops (U2, U3) is therefore configured as a monostable multivibrator, also called a one-shot, which provides an output pulse of a preconfigured pulse width upon receiving a trigger input.

Figure 4:
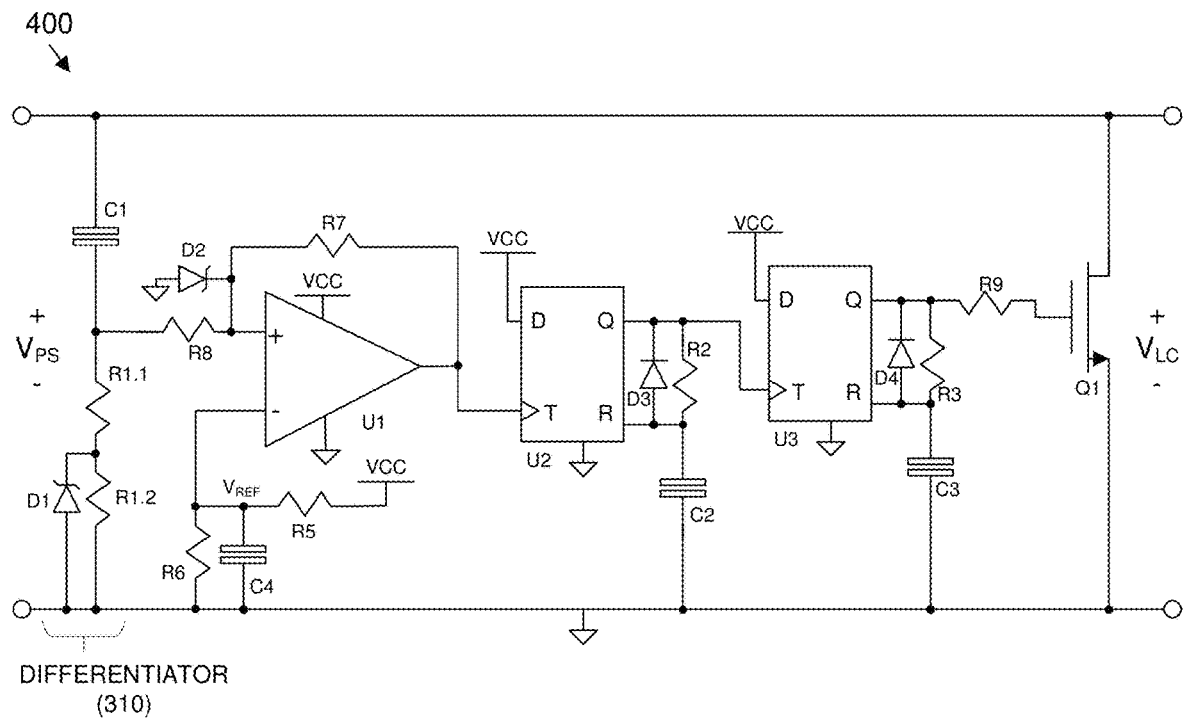
FIG. 4 is a schematic diagram showing a further embodiment of a circuit in accordance with the invention.

FIG. 4 is a schematic of a further implementation of a circuit (400) in accordance with the invention. Like reference numerals of the circuit (300) of FIG. 3 represent like parts in the circuit (400) of FIG. 4. A SPICE simulation of the circuit (400) shown in FIG. 4 was performed, using the following values for the circuit elements:

TABLE 1

| Circuit elements of circuit (400) in FIG. 4 | |
|---|---|
| Circuit element | Value |
| VCC | 12 V |
| C1 | 10 nF |
| R1.1 | 2.2 kΩ |
| R1.2 | 22 kΩ |
| D1 | 6.8 V Zener |
| R2 | 180 kΩ |
| C2 | 1 µF |
| R3 | 220 kΩ |
| C3 | 100 nF |
| R5 | 120 kΩ |
| R6 | 1.5 kΩ |
| C4 | 100 nF |
| R7 | 10 MΩ |
| R8 | 56 kΩ |
| D2 | 3.9 V Zener |
| D3 | 1N4007 Silicon diode |
| D4 | 1N4007 Silicon diode |
| R9 | 1.5 kΩ |
| Q1 | IRF530 N-channel FET |
| U1 | TLC271H opamp |
| U2, U3 | CD4013B CMOS Dual |

A PV array of seven PV modules connected in series was used as DC power source. Additional components have been added to the circuit (400) in FIG. 4 (as compared to that of FIG. 3), which doesn't substantially influence the general operation of the circuit, but which may provide better stability and robustness to enable the circuit (400) to perform reliably in the field.

From the component values shown in Table 1 above, it is evident that the time constant of the RC circuit (R2, C2) of the first flip-flop used in this simulation is about 8 times that of the RC circuit (R3, C3) of the second flip-flop. However, it was stated above that the resistors and capacitors of these two RC circuits (R2C2, R3C3) are chosen so that the time constant of the second flip-flop's RC circuit (R3, C3) is approximately 10 times smaller. From the simulation, it is therefore evident that the required ratio of the time constant between the two RC circuits is not fixed. The overarching requirement is, rather, that the time constants of the two RC circuits are chosen such that the lockout period is sufficiently long to prevent an inadvertent trigger signal being caused by the rising edge of the power supply voltage ($V_{PS}$) when the FET (Q1) is removed (i.e. when the near short-circuit is removed).

These include D2, which protects the non-inverting input from over-voltage since pulse values exceeding 3.9V will be clamped by the 3.9V Zener diode. R7 and R8 provide some hysteresis to the comparator (320) to prevent a false trigger caused by noise. D1 has the effect that a negative pulse output from the differentiator (310) will be substantially smaller than a positive. On a positive pulse, the total value of R1 will be the sum of R1.1 and R1.2. On a negative pulse, diode D1 will effectively short-circuit R1.2; and the total value of R1 will only be that of R1.1.

Voltage divider R5 and R6 provide a reference voltage ($V_{ref}$) for the comparator (320), and capacitor C4 provides stability for the reference voltage. Diodes D3 and D4 ensure a fast discharge for capacitors C2 and C3.

Although the rising edge detector in the embodiments of FIGS. 3 and 4 (300, 400) are provided by a differentiator and comparator (in an analogue component implementation), it will be appreciated that the functionality of the rising edge detector may also be provided by, for example, a digital implementation with a processor (microprocessor, FPGA, CPLD, and the like), possibly in conjunction with a built-in or external analogue to digital converter. In such embodiments, the functionality of the rising edge detector may be performed by the processor by sampling the power source output voltage to monitor and detect a rising edge in the power supply output voltage. Upon detection of a rising edge in the power supply output voltage, the processor may then produce a trigger signal to trigger the damping component.

Figure 5:
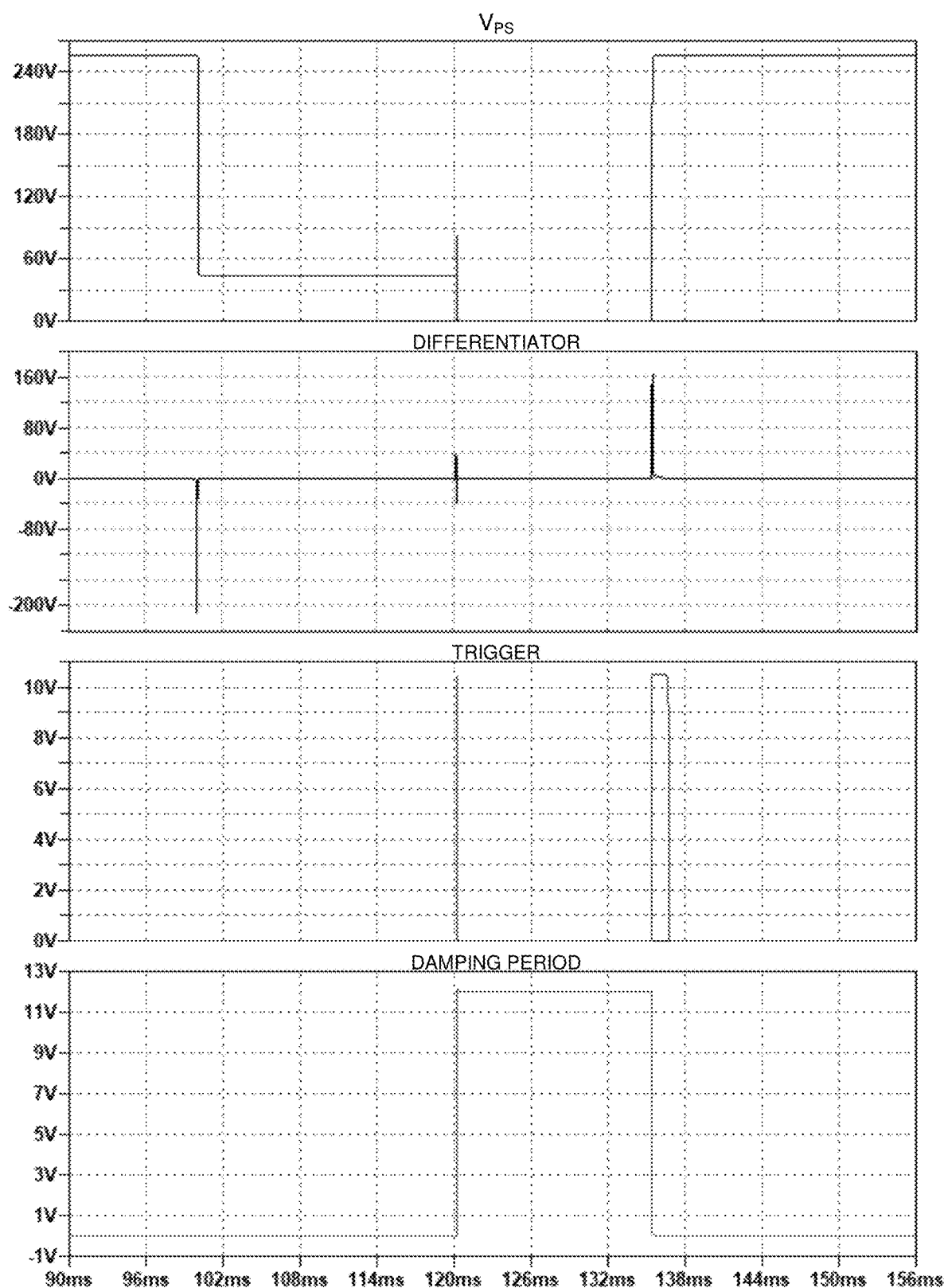
FIG. 5 are graphs showing various voltages during a simulation of the schematic of FIG. 4.

FIG. 5 shows various plots of voltages from the circuit (400) of FIG. 4 that has been simulated using SPICE. The top-most trace is that of the power supply voltage output ($V_{PS}$), which it will be recalled is the same voltage as the load circuit input voltage ($V_{LC}$). Below that is a trace of the voltage at the junction of the RC differentiator (310), which is also the input to the non-inverting input of the opamp (U1).

That is followed by a trace of the trigger signal, which is the output of the opamp (U1) and the input to the trigger input (T) of the first flip-flop (U2). The bottom-most trace in FIG. 4 shows the output of the second flip-flop (U3), which is the signal that switches on the FET (Q1), short-circuiting the input voltage to the load circuit ($V_{LC}$).

Figure 6:
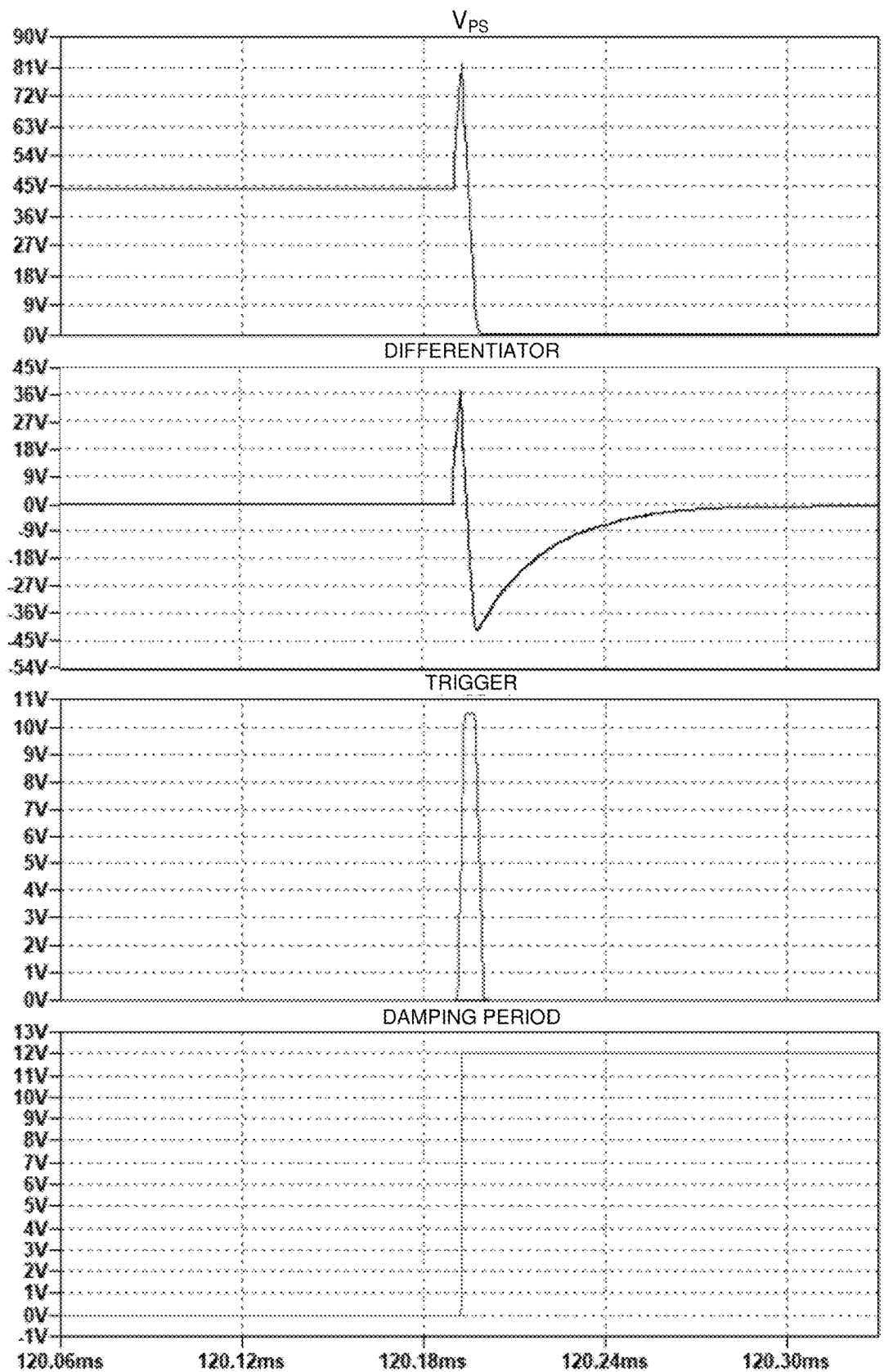
FIG. 6 are the graphs of FIG. 5 over a particular time window.

The trace of $V_{PS}$ at 90 ms corresponds to the scenario at $t_0$ in FIG. 2, that is when the contact (164) is open and the PV module (150) output voltage ($V_{PS}$) is at its open-loop voltage. At 100 ms, the contact (164) closes, connecting the load (162) into the circuit to draw power from the PV module (150), causing the power supply output voltage $V_{PS}$ to drop from about 250V to about 45V due to the internal resistance of the PV module. This causes a negative pulse on the differentiator output which does not cause the comparator (320) to produce a trigger signal, since it does not exceed the reference voltage on the inverting input of the opamp (U1). At about 120 ms the contact (164) opens, causing a brief rising edge in the power supply voltage ($V_{PS}$) and, consequently, a positive pulse is produced by the differentiator (310). This is more clearly shown in FIG. 6, which zooms in on the events at 120 ms.

When the differentiator (310) causes the non-inverting input of the opamp (U1) to exceed the reference voltage ($V_{REF}$) on its inverting input, the output of the opamp (U1) produces a 12V pulse, i.e. the trigger signal. The trigger signal causes the output (Q) of the first flip-flop (U2) to produce a 12V pulse for the duration of the lockout period (discussed in more detail below) which, in turn, causes the output (Q) of the second flip-flop (U3) to produce a 12V pulse for the duration of the damping period (DP). This, as aforementioned, switches on the FET (Q1) and connects the low impedance of the FET's internal resistance across the power supply output voltage ($V_{PS}$), thereby causing it to become momentarily lowered to about 350 mV, according to the simulation. This is a low enough voltage to cause any arc that may have formed across the contact (164) to be quenched.

Figure 7:
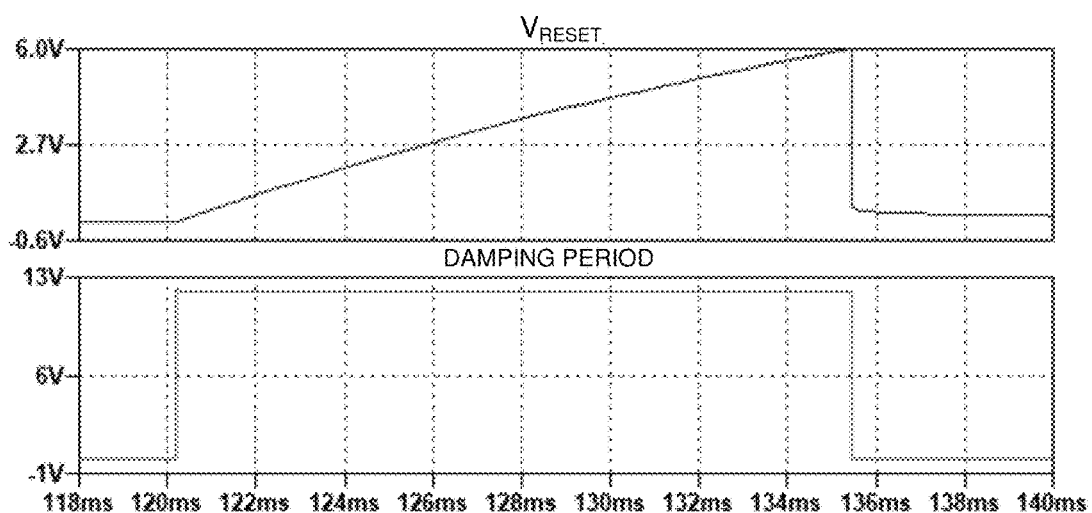
FIG. 7 are graphs showing voltages on an output pin and a reset pin of a flip-flop in the circuit of FIG. 4.

FIG. 7 shows the output (Q) of the second flip-flop (U3) on its bottom trace, and the voltage caused by the RC circuit on the reset input (R) of the second flip-flop on its top trace. When the output (Q) of the second flip-flop (U3) goes high (12V) at about 120 ms, the capacitor C3 begins to charge and reaches a voltage at about 135 ms at which the reset input (R) of the flip-flop (U3) considers the input to be a logic 1. This causes the second flip-flop (U3) to be reset and its output (Q) to become a logic 0, i.e. 0V. That, in turn, switches off the FET (Q1) and disconnects the low impedance (or near short-circuit) that had been connected across the power supply input voltage ($V_{PS}$) so that this voltage returns to its normal, open-loop voltage.

Briefly referring back to FIG. 5, it is notable that, when the power supply output voltage ($V_{PS}$) returns to its open-loop voltage at about 135 ms, there is a rising edge which causes the differentiator (310) to produce a positive pulse, allowing the rising edge to be detected by the comparator (320) and a trigger pulse is produced. However, since the lockout period had not yet expired, this trigger pulse does not cause another near short-circuit be made by the FET (Q1).

Figure 8:
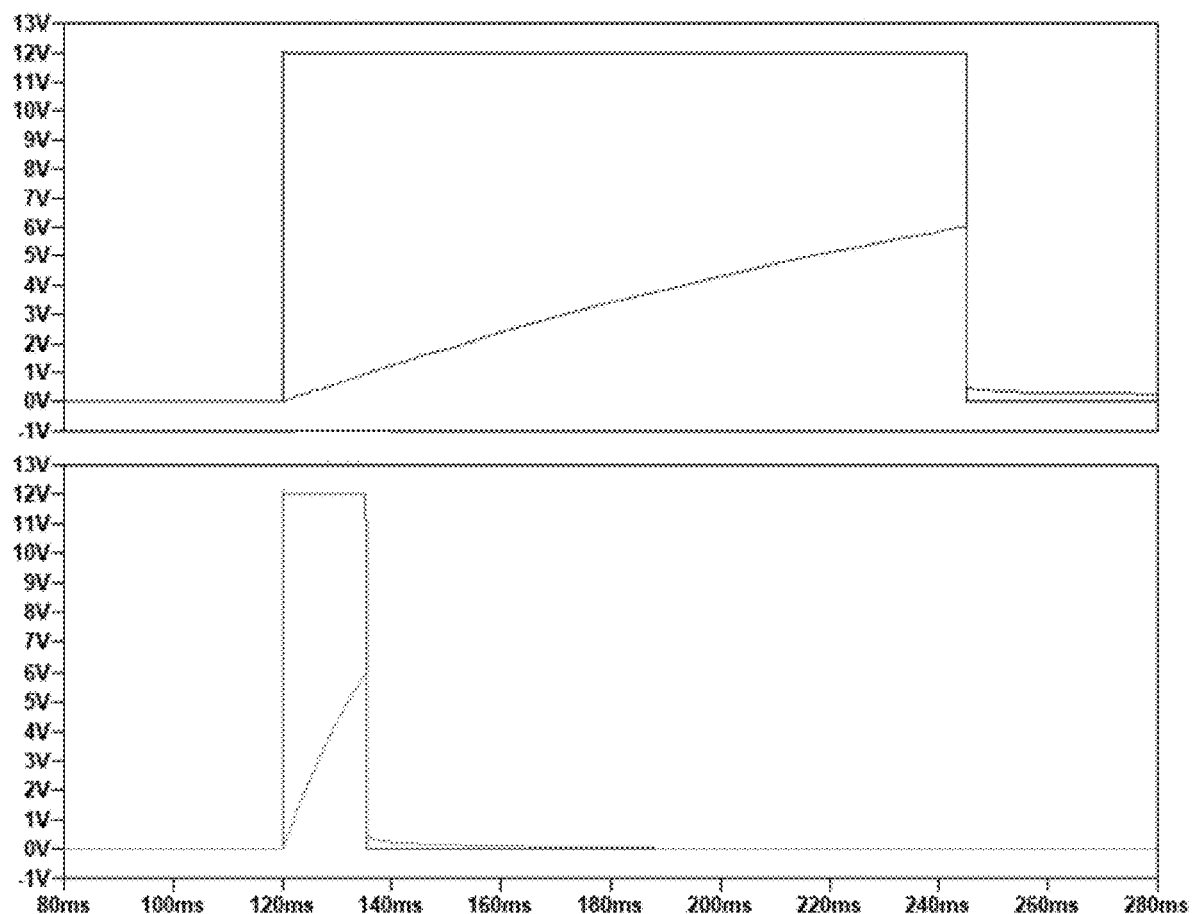
FIG. 8 are graphs showing voltages on output pins and a reset pins of both flip-flops in the circuit of FIG. 4.

Referring now to FIG. 8, its top trace shows the output voltage (Q) of the first flip-flop (U2) (which forms the lockout component (140)) together with the voltage on its reset pin (R). The bottom trace of FIG. 8 shows the same for the second flip-flop (U3). The time constant of the RC circuit on the reset input (Q) of the first flip-flop (U2) clearly causes its capacitor (C2) to charge much slower, which in turn causes the first flip-flop to be reset much later than the second flip-flop (U3) allowing the lockout period to be considerably longer than the damping period (DP).

Figure 9:
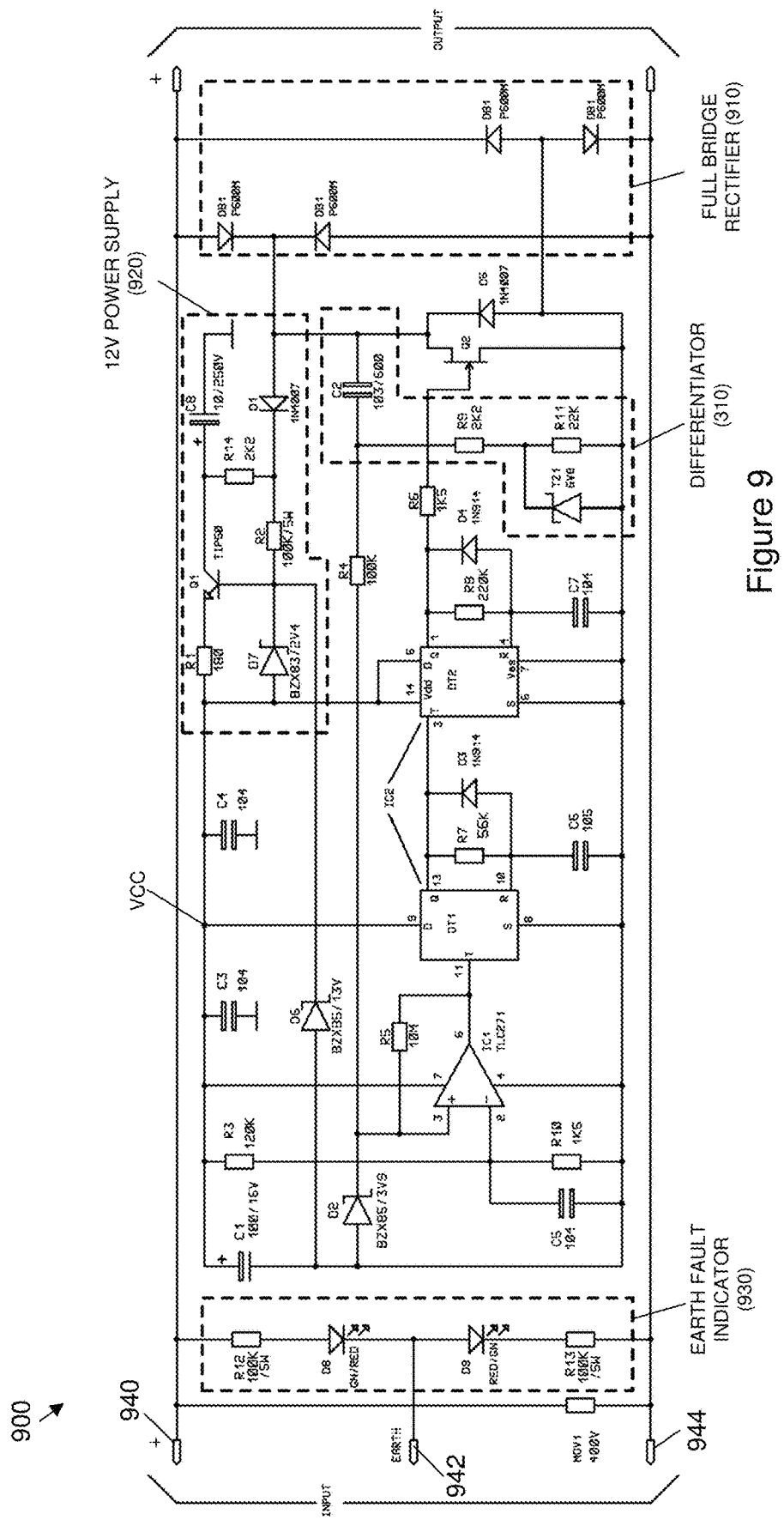
FIG. 9 is a schematic diagram of a further embodiment of a circuit in accordance with the invention.

FIG. 9 is a schematic of a further circuit (900) in accordance with the invention. The component annotations in FIG. 9 do not correspond with those in FIGS. 3 and 4. However, the topology of the circuit (900) of FIG. 9 corresponds largely to that of FIG. 4. For example, the differentiator (310) shown in FIG. 9 has the same configuration as in FIG. 4, with the resistive part of the RC differentiator comprising two resistors with a Zener diode across the 22 kΩ resistor.

The circuit (900) further includes a full bridge diode rectifier (910), which both protects the circuit (900) from reverse polarity connection to the power supply, i.e. the PV module (150), and furthermore enables its proper operation despite a reverse polarity connection. It is worth noting that the load current does not flow through the rectifier (910), but only the current flowing through the FET during the damping period when the FET momentarily causes a near short-circuit across the load circuit.

The circuit (900) also shows a practical implementation of an internal linear power supply (920) to provide the 12V internal voltage (VCC).

The circuit (900) also includes an earth fault indicator (930) with two light emitting diodes (LED's) D8 and D9. The first LED (D8) is connected between a positive power source connection (940) and an earth connection (942). The second LED is connected between the earth connection (942) and a negative power source connection (944). If there is no fault from either the positive connection (940) or the negative connection (944) to the earth connection (942), both LED's illuminate. If the positive connection (940) has an earth fault, the first LED ((D8) will not illuminate, and similarly the second LED (D9) will not illuminate if the negative connection (944) has an earth fault. The circuit (900) also includes an FNR-20K681 varistor (MOV1) across the positive power source connection (940) and the negative connection (944) to suppress voltage spikes.

Figure 10:
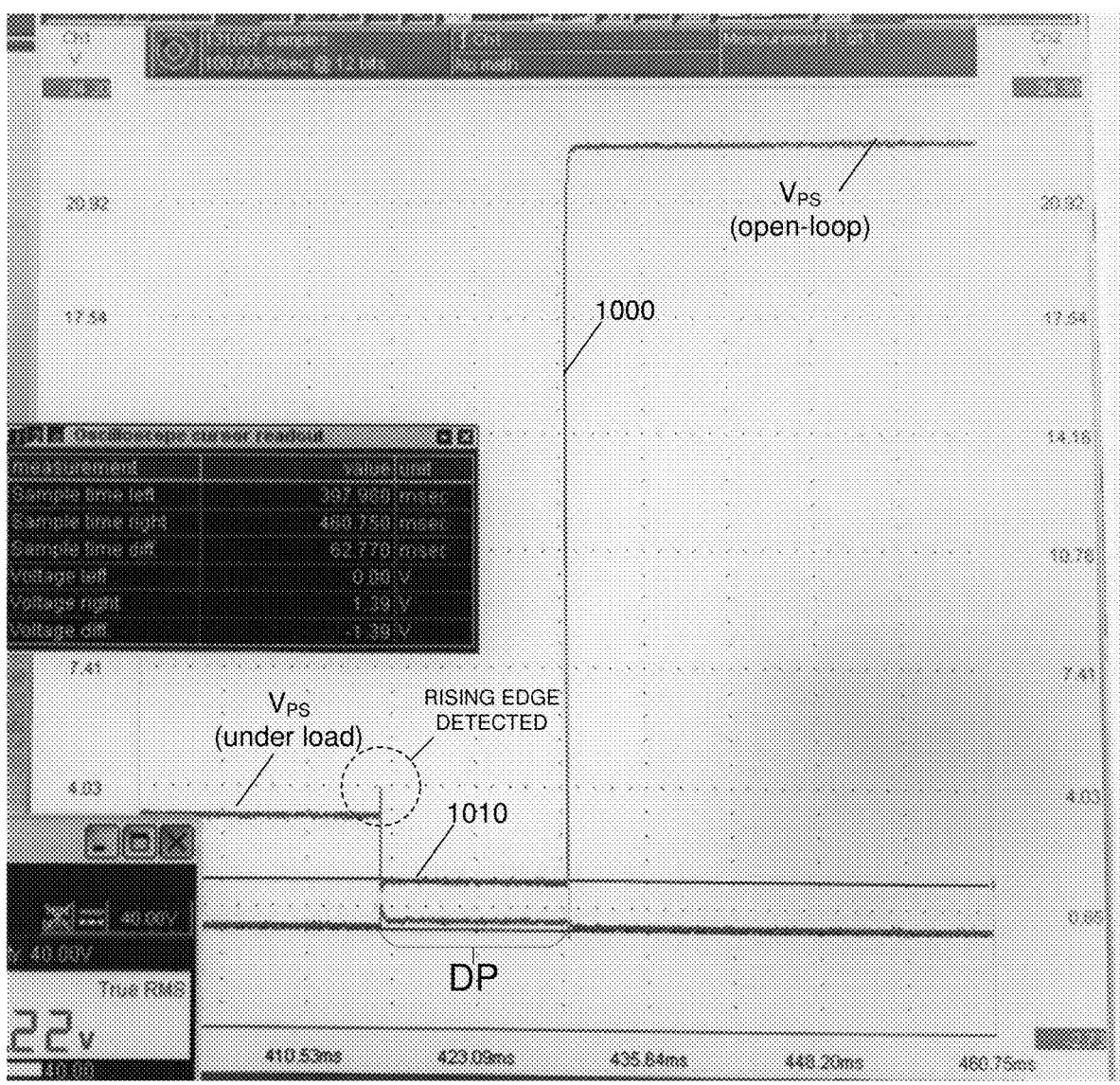
FIG. 10 is a screenshot of oscilloscope measurements of the circuit of FIG. 9 under test.

FIG. 10 shows a screenshot of an oscilloscope measurement of the circuit (900) of FIG. 9 being powered from a PV array with 7 PV panels (or PV modules) connected in series, and producing an open-loop output voltage of about 226V. The power supply voltage is shown by trace (1000) on FIG. 10 and is measured with a 10× oscilloscope probe, hence the open-loop voltage appearing to be 22.6V as the measurement is 10 times smaller than the actual measured voltage. The second trace (1010) is that of the output (Q) of the second flip-flop (U3), which drives the FET (Q1) to short-circuit the power supply voltage.

Figure 11:
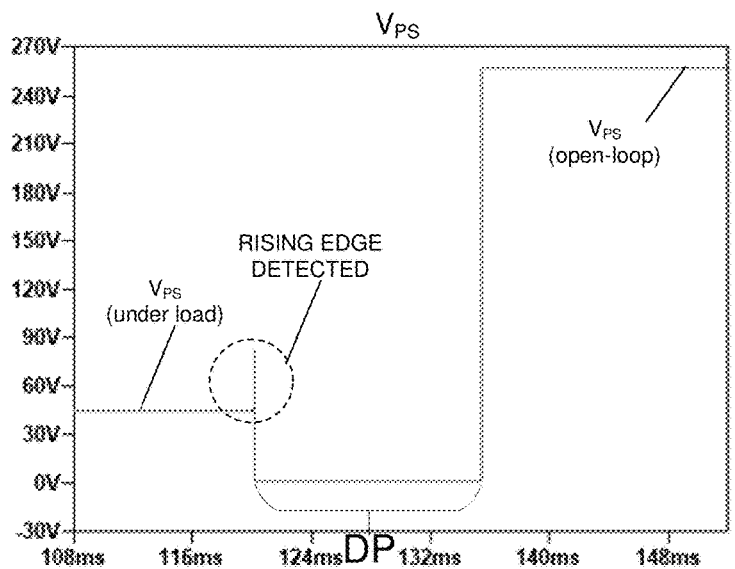
FIG. 11 is a graph from the simulation results of the power supply voltage that corresponds with the trace in FIG. 10.

It is notable that the first trace (1000) of the power supply output voltage ($V_{PS}$) is strikingly similar to the simulation results shown in the top trace of FIG. 5 between about 114 ms and 144 ms, and which is also showed in FIG. 11.

The Applicant has performed experiments with a small relay with a contact rated for switching AC current, to switch DC current from the 7-panel PV array mentioned above to an electric element with an approximate power rating of 1.2 kW. In the absence of the circuit (900), the relay contact fails catastrophically by burning out as soon as the contacts open while conducting current. Conversely, in the presence of the circuit (900) the same model relay switches without incident and the Applicant has run an endurance test with hundreds of switching cycles with the small relay showing no distress whatsoever.

Figure 12:
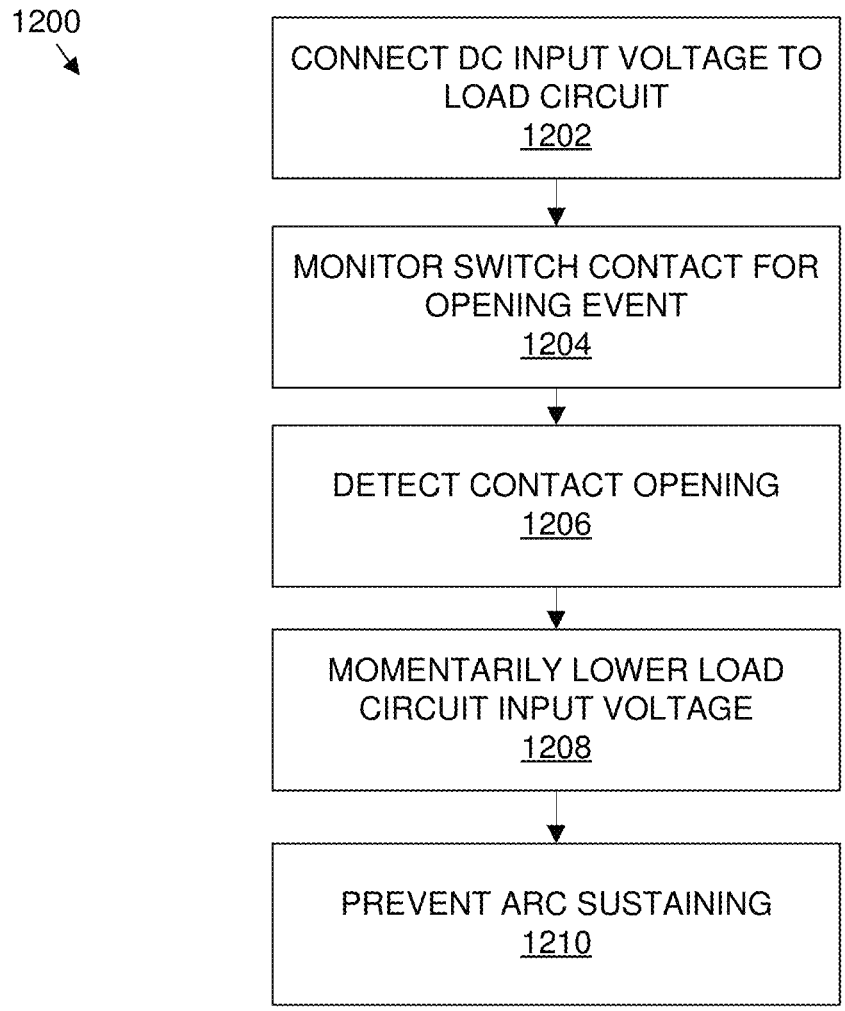
FIG. 12 is a flow diagram of a method in accordance with the invention.

FIG. 12 is a flow diagram of a method (1200) of enabling a direct current (DC) power source to power a load circuit designed for alternating current (AC) input.

A DC input voltage is connected (1202) to a load circuit. The DC input voltage derived from a DC power source such as the PV module (150) of FIG. 1. A switch contact is monitored (1204) to detect an opening event of the contact. The contact is connected in series with a load in the load circuit, similarly as shown in FIG. 1. In response to an opening event of the contact being detected (1206), the input voltage to the load circuit is momentarily lowered (1208). The momentary lowering of the load circuit input voltage prevents (1210) the sustaining of an electric arc across the opened switch contact.

The invention therefore provides a circuit and a method enabling a direct current source to power a load circuit designed for alternating current input and, particularly, having a switch contact designed for alternating current, including bi-metallic thermostats, contactors, relays, circuit breakers and toggle switches with contacts rated for AC, to name but a few examples.

It may find particular application in enabling the powering of a hot water cylinder with a thermostat designed for AC current using a PV module as a DC power source.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A circuit having an input arranged to be connected to a direct current (DC) power source and an output arranged to be connected to a load circuit, the load circuit including an electric load and a switch with a mechanical contact in series with the load, wherein the circuit comprises a contact opening detector arranged to detect a rising edge in a voltage of the DC power source at the input which indicates an opening event of the switch contact; and a damping component arranged to be triggered by the contact opening detector when detecting a contact opening event, the triggered damping component causing a momentary lowering of a voltage of the circuit output and thereby of the load circuit input, such that the momentary lowering of the load circuit input voltage prevents the sustaining of an electric arc across the opened switch contact.

2. The circuit as claimed in claim 1 wherein the DC power source has an internal resistance such that contacts of the switch contact being closed causes the voltage of the DC power source to lower, the subsequent opening of the switch contact causing the voltage of the DC power source to rise again, wherein the contact opening detector produces a trigger signal when the rising edge is detected.

3. The circuit as claimed in claim 2 wherein the contact opening detector includes a differentiator circuit.

4. The circuit as claimed in claim 3 wherein the contact opening detector further includes a comparator component arranged to produce the trigger signal if a differentiator output voltage exceeds a reference voltage.

5. The circuit as claimed in claim 1 wherein the damping component is arranged to be triggered for a configured damping period and to reset the damping component after the lapsing of the damping period, thereby undoing the lowering of the load circuit input voltage.

6. The circuit as claimed in claim 5 further including a lockout component arranged to disable the damping component from again being triggered for a lockout period following the triggering of the damping component, the lockout period being longer than the damping period, so as to prevent the damping component from being triggered due to a rising edge in the voltage of the DC power source caused by the resetting of the damping component.

7. The circuit as claimed in claim 6 wherein the lockout component comprises a first monostable multivibrator arranged to be triggered by the trigger signal and to produce an output pulse corresponding to the lockout period; and
wherein the damping component includes a second monostable multivibrator arranged to be triggered by the output pulse of the first monostable multivibrator and to produce an output pulse corresponding to the damping period, and
a damping switch activated by the output pulse of the second monostable multivibrator, the damping switch arranged to lower the load circuit input voltage by connecting a low impedance damping load in parallel with the load circuit when activated.

8. The circuit as claimed in claim 7 wherein the damping switch is a semiconductor switch, and wherein the impedance of the damping load is provided by an on-state resistance of the semiconductor switch.

9. The circuit as claimed in claim 7 wherein each of the first and second monostable multivibrators are formed by a first and a second D-type flip-flop respectively, each of the first and second flip-flop having its data input connected to a constant high input so as to produce a high output value on its output pin upon a rising edge occurring on its clock input, and an RC circuit connected to the output pin of the flip-flop configured to produce a timed rising voltage upon the output pin outputting a high value, wherein the rising voltage of the RC circuit is connected to a reset pin of the flip-flop so as to cause the flip-flop to be reset after a period determined by the time constant of the RC circuit.

10. The circuit as claimed in claim 9 wherein the trigger signal of the comparator is connected to the clock input of the first flip-flop, the output of the first flip-flop connected to the clock input of the second flip flop and the output of the second flip flop is connected to the damping switch; and wherein the lockout period and the damping period is determined by the time constant of the RC circuit of the first and second flip-flop respectively.

11. The circuit as claimed in claim 1 further including a full-bridge rectifier to enable reverse-polarity connection of the circuit to the DC power source.

12. The circuit as claimed in claim 1 further including an indicator arranged to indicate when a terminal of the DC power source conducts electric current to an earth connection.

13. The circuit as claimed in claim 12 wherein the indicator includes a first light emitting diode (LED) connected between a positive DC power source connection and the earth connection; and a second light emitting diode connected to the earth connection and a negative DC power source connection, such that both LED's illuminate when neither DC power source connection conducts electric current to the earth connection and such that only one of the first or second LED illuminates if the negative or positive DC power source connections conducts electric current to the earth connection.

14. A method of enabling a direct current (DC) power source to power a load circuit designed for alternating current (AC) input comprising the steps of:

connecting a DC input voltage to a load circuit, the DC input voltage being derived from a DC power source;

monitoring a voltage of the DC power source for a rising edge which indicates an opening event of a switch contact, the switch contact being connected in series with a load in the load circuit; and in response to an opening event of the contact being detected, momentarily lowering the output voltage of the circuit and thereby the input voltage of the load circuit, such that the momentary lowering of the load circuit input voltage prevents the sustaining of an electric arc across the opened switch contact.

15. The method as claimed in claim 14 wherein the DC power source has an internal resistance such that the switch contact being closed causes the voltage of the DC power source to lower, the subsequent opening of the switch contact causing the voltage of the DC power source to rise again, wherein a trigger signal is produced in response to detecting the rising edge.

16. The method as claimed in claim 14 wherein detecting the rising edge in the voltage of the DC power source includes producing a time derivative voltage signal of the voltage of the DC power source.

17. The method as claimed in claim 16 wherein detecting the rising edge in the voltage of the DC power source includes comparing the time derivative voltage signal to a reference voltage, and wherein the trigger signal is produced if the time derivative voltage signal exceeds the reference voltage.

18. The method as claimed in claim 15 wherein the trigger signal is produced for a configured damping period, the method including undoing the lowering of the load circuit input voltage after the lapsing of the damping period.

19. The method as claimed in claim 18 including disabling, for a lockout period following the producing of the trigger signal, the detecting of a rising edge in the voltage of the DC power source caused by undoing the lowering of the load circuit input voltage.

20. The method as claimed in claim 18 wherein momentarily lowering the input voltage of the load circuit includes connecting a low impedance damping load in parallel with the load circuit for the duration of the damping period.

* * * * *